(12) United States Patent
Antila et al.

(10) Patent No.: US 11,698,303 B2
(45) Date of Patent: Jul. 11, 2023

(54) METHOD AND SYSTEM FOR ANALYSING A CHEMICAL COMPOSITION OF A TARGET USING A FABRY-PEROT INTERFEROMETER

(71) Applicant: Spectral Engines Oy, Helsinki (FI)

(72) Inventors: Jarkko Antila, Helsinki (FI); Uula Kantojärvi, Helsinki (FI)

(73) Assignee: Spectral Engines Oy, Helsinki (FI)

( * ) Notice: Subject to any disclaimer, the term of this patent is extended or adjusted under 35 U.S.C. 154(b) by 0 days.

(21) Appl. No.: 16/234,641

(22) Filed: Dec. 28, 2018

(65) Prior Publication Data
US 2020/0209150 A1    Jul. 2, 2020

(51) Int. Cl.
*G01J 3/26* (2006.01)
*G01N 21/31* (2006.01)
*G01J 3/45* (2006.01)

(52) U.S. Cl.
CPC . *G01J 3/26* (2013.01); *G01J 3/45* (2013.01); *G01N 21/314* (2013.01); *G01N 2021/3129* (2013.01); *G01N 2201/1293* (2013.01)

(58) Field of Classification Search
CPC ......... G01N 21/314; G01N 2201/1293; G01N 2021/3129; G01J 3/26; G01J 3/45
See application file for complete search history.

(56) References Cited

U.S. PATENT DOCUMENTS

| | | | | |
|---|---|---|---|---|
| 4,014,614 A * | 3/1977 | Sandercock | ............... | G01J 3/26 356/454 |
| 4,018,529 A * | 4/1977 | Barrett | ............... | G01J 3/26 356/45 |
| 5,144,498 A * | 9/1992 | Vincent | ............... | G01J 3/26 359/359 |
| 5,218,422 A | 6/1993 | Zoechbauer | | |
| 2002/0101588 A1* | 8/2002 | Sandstrom | ............... | G01J 3/12 356/334 |
| 2002/0131054 A1* | 9/2002 | Korn | ............... | G01J 3/26 356/519 |
| 2004/0239913 A1* | 12/2004 | Kobayashi | ............... | G01S 17/95 356/4.01 |
| 2005/0073690 A1* | 4/2005 | Abbink | ............... | G01J 9/02 356/451 |
| 2009/0273777 A1* | 11/2009 | Yun | ............... | G01J 3/26 356/300 |
| 2010/0097613 A1* | 4/2010 | Saari | ............... | G02B 26/001 356/454 |
| 2010/0250182 A1* | 9/2010 | Matsumoto | ............... | G01J 3/02 702/106 |

(Continued)

FOREIGN PATENT DOCUMENTS

EP    2720014 B1    4/2014
WO   WO W02007135244 A2   11/2007

*Primary Examiner* — Michael P LaPage
(74) *Attorney, Agent, or Firm* — Laine IP Oy (57) ABSTRACT

According to an example aspect of the present invention, there is provided a method for analysing a chemical composition of a target, the method comprising placing an electrically tunable Fabry-Perot interferometer in a path of radiation emitted by a radiation source, and detecting the radiation, which has passed the Fabry-Perot interferometer and which has passed or was reflected by the target, by means of a detector, and wherein detection is made such that multiple pass bands are allowed to be detected simultaneously.

11 Claims, 8 Drawing Sheets

(56) References Cited

U.S. PATENT DOCUMENTS

| | | | |
|---|---|---|---|
| 2012/0026503 A1 | 2/2012 | Lewandowski et al. | |
| 2012/0038928 A1* | 2/2012 | Saari | G01J 3/32 |
| | | | 356/454 |
| 2013/0329232 A1 | 12/2013 | Antila et al. | |
| 2014/0376816 A1* | 12/2014 | Lagae | G03H 1/22 |
| | | | 382/195 |
| 2015/0092194 A1* | 4/2015 | Waldmann | G01N 21/3504 |
| | | | 356/454 |
| 2015/0253189 A1 | 9/2015 | Yetzbacher et al. | |
| 2017/0167919 A1* | 6/2017 | Learmonth | G01J 3/0275 |
| 2017/0269351 A1* | 9/2017 | Saari | G02B 26/001 |
| 2018/0373009 A1* | 12/2018 | Yuste | G02B 21/367 |

* cited by examiner

METHOD AND SYSTEM FOR ANALYSING A CHEMICAL COMPOSITION OF A TARGET USING A FABRY-PEROT INTERFEROMETER

FIELD

The present invention relates to a method for analysing a chemical composition of a target. In particular, the present invention relates to a method comprising use of a Fabry-Perot interferometer.

Further, the present invention relates to a system for analysing a chemical composition of a target. In particular, the present invention relates to a system comprising a Fabry-Perot interferometer.

BACKGROUND

Analysing chemical composition of samples is important in many contexts. Several analytical methods are available. Optical measurement systems are e.g. used for analysing properties or material contents of an object. Spectroscopy is used to identify various unknown substances by reading spectroscopic patterns. The spectrum of an object can be measured by using spectrometer comprising a Fabry-Perot interferometer and a detector for monitoring intensity of light transmitted through the Fabry-Perot interferometer. Optical spectroscopy systems further typically comprise a light source for illuminating the object. Some optical material analysers are large, non-portable units intended for use in laboratories. Other optical material analysers are portable.

A Fabry-Perot interferometer is based on two mirrors, i.e. an input mirror and an output mirror arranged facing the input mirror via a gap. In this document, a "mirror" is a structure where there is a layer or a set of layers which reflects light. The pass band wavelength can be controlled by adjusting the distance between the mirrors, i.e. the width of the gap. The Fabry-Perot interferometer may provide a narrow transmission peak, which has adjustable spectral position, and which can be used for spectral analysis.

A spectrometer may provide a control signal indicative of the mirror gap. The control signal may be provided e.g. by a control unit, and the mirror gap may be controlled according to the control signal. Alternatively, the control signal may be provided by monitoring the mirror gap, e.g. by using a capacitive sensor. The control signal may be e.g. a digital control signal or an analog control signal. Each spectral position may be associated with a control signal.

Document US 2015/0253189 A1 teaches that scanning Fabry-Perot interferometers require optical inputs with bandwidth less than one single free spectral range of the device. This is due to the ambiguity between signals arising from colors separated by one free spectral range for any Fabry-Perot interferometer. Document US 2015/0253189 A1 further teaches that Fabry-Perot theory is only valid within one free spectral range, and is not capable of demultiplexing mixed signals.

Current approaches for realizing a miniaturized near infrared spectrometer for material analysis have reached their potential. The most promising one when concerning the size and cost requirements of various mobile and handheld applications is a MEMS Fabry-Perot-interferometer-based system. This is due to a very small footprint, a simple system realization, and because only a single pixel detector is required.

Use of micromechanical technology for producing Fabry-Perot-interferometers is common. For example, documents US 2012/0026503 A1 and US 2013/0329232 A1 disclose controllable Fabry-Perot-interferometers which are produced with micromechanical (MEMS) technology.

A major drawback in many applications is that a single MEMS FPI element only works in a limited wavelength range, reducing the number of applications that can be realized with a single device and reducing the selectivity and sensitivity of the measurement.

There are three factors limiting the usable spectral range. In particular, the working range of the mirrors is limiting the usable spectral range. In MEMS-devices, the mirrors are realized using dielectric stacks which are optimized to a certain wavelength. If one moves away from this wavelength by, for example, ±30%, the mirrors do not reflect anymore and thus the interference does not occur. Further, the tuning range of a MEMS mirror is limiting the usable mechanical range. This is usually limited by the so called pull-in phenomenon, which limits the movement of the interferometer gap to about ⅓ of the nominal gap. Additionally, multiple order transmission is limiting the usable spectral range. A Fabry-Perot interferometer transmits several wavelengths simultaneously, separated by multiple order of half the wavelength. In the MEMS FPI device the range-limiting factors are in the order 3-2-1, such that the multiple order problem is the most range-limiting factor. If the mirror reflective surfaces are made using metallic coatings instead of dielectric, and the movement of the mirror is not realized by electrostatic tuning (but for example with piezoelectric elements), then the multiple order limitation can be considered as the only practical limitation of the Fabry-Perot interferometer's spectral range.

The first problem is tackled by using as high index of refraction difference materials in the mirror stack and as low amount of layers. Another option is to use metallic layers, but this is not often possible for a MEMS FPI. In any case, there will be transmission sidebands coming through which might make analysis difficult and therefore the unwanted sidebands are always removed using different filters, detector and light source solutions.

The second problem is partly avoided by using a low order of interference as possible so that the spectral transmission peak moves as much as possible during a scan. Also schemes like current drive or different feedback solutions have been presented to extend the range of movement.

The third problem is dealt with using a band-limiting filter in the system, which limits the range to be measured to an unambiguous peak. Getting signal from a neighboring peak is an unwanted situation as it destroys the shape of the measured spectrum.

Additionally, statistical mathematical analysis, also referred to as chemometrics, is nowadays commonly used to interpret and model overlapping spectral data. The more data from as wide a spectral range as possible gives the best results from specificity and accuracy point of view. So far the method has only be used such that the data provided by a spectrometer is unambiguous but the measured spectrum can have a lot of overlapping shapes. Now, in fact, it does not make a difference for the statistical tools whether the spectra are overlapping in the sample or in the measurement device or both. If this property is taken advantage of, the multiple order filtering can be either removed completely or significantly relaxed. If radiation through several transmission peaks is detected simultaneously with a detector, the gap is moved and the measurement repeated, all the same information about the material to be measured is obtained and therefore the chemometrical tools will provide equally good results compared to a single peak scanning a much wider range.

In view of the foregoing, it would be beneficial to provide a solution at least to the third aforementioned problem. The solution may also enable several other beneficial features.

SUMMARY OF THE INVENTION

The invention is defined by the features of the independent claims. Some specific embodiments are defined in the dependent claims.

According to a first aspect of the present invention, there is provided a method for analysing a chemical composition of a target, the method comprising placing an electrically tunable Fabry-Perot interferometer in a path of radiation emitted by a radiation source, and detecting the radiation, which has passed the Fabry-Perot interferometer and which has passed or was reflected by the target, by means of a detector, and wherein detection is made such that multiple pass bands are allowed to be detected simultaneously.

Various embodiments of the first aspect may comprise at least one feature from the following bulleted list:
the detector comprises only one pixel for detecting radiation
the detector comprises a matrix of pixels for imaging purposes
multiple pass bands are allowed to be detected simultaneously by a single detector
a false spectrum, which is sensitive to a specific chemical material, is intentionally created
a plurality of transmission peaks is scanned simultaneously
at least two transmission peaks are measured simultaneously
a combination of detected signals is analysed
mixed signals are analysed
mixed signals are analysed without utilizing signal separation techniques
a sum of signals is analysed
a sum of signals is analysed without utilizing signal separation techniques
optical inputs with bandwidth of more than one single free spectral range of the Fabry-Perot interferometer are used
band-limiting filters are not used in the method
cut off values of a band-limiting filter are selected such that a detection range of a spectrometer is greater than a free spectral range
cut off values of the band-limiting filter are selected such that spectral components overlapping other transmission peaks propagate to the detector
the method further comprises placing an electrically tunable Fabry-Perot interferometer in a path of radiation emitted by a radiation source, and detecting the radiation, which has passed the Fabry-Perot interferometer and which has passed or was reflected by a known reference substance, by means of a detector, and wherein detection is made such that multiple pass bands are allowed to be detected simultaneously
reference data of at least one known reference substance is stored
scanned target data is compared with reference data of the at least one known reference substance
the method is an imaging method or a non-imaging method According to a second aspect of the present invention, there is provided a system for analysing a chemical composition of a target, the system comprising an electrically tunable Fabry-Perot interferometer which is capable of being placed in a path of radiation emitted by a radiation source, and a detector for detecting the radiation, which has passed the Fabry-Perot interferometer and which has passed or was reflected by the target, and wherein the detector is configured to detect the radiation such that multiple pass bands are allowed to be detected simultaneously.

Various embodiments of the second aspect may comprise at least one feature from the following bulleted list:
the detector comprises only one pixel for detecting radiation
the detector is configured to detect the radiation such that multiple pass bands are allowed to be detected simultaneously by a single detector
the detector is configured to detect a sum of signals
the system is configured to scan a plurality of transmission peaks simultaneously
the system is configured to measure at least two transmission peaks simultaneously
the system comprises a computing device which is configured to analyse a combination of detected signals
the system comprises a computing device which is configured to analyse mixed signals
the system is configured to provide optical inputs with a bandwidth of more than one single free spectral range of the Fabry-Perot interferometer
the system does not include a band-limiting filter
the system includes a band-limiting filter with cut off values, which provide a detection range of a spectrometer greater than a free spectral range
the system includes a memory for storing reference data of at least one known reference substance
the system includes means for comparing scanned target data with reference data of the at least one known reference substance
the detector comprises a matrix of pixels for imaging purposes According to a third aspect of the present invention, there is provided a method for analysing a chemical composition of a target, the method comprising placing an electrically tunable Fabry-Perot interferometer in a path of radiation emitted by a radiation source, and detecting the radiation, which has passed the Fabry-Perot interferometer and which has passed or was reflected by the target, by a detector, and wherein detection is made such that multiple pass bands are allowed to be detected simultaneously by a detector comprising only one pixel for detecting radiation, and wherein a sum of signals is analysed without utilizing signal separation techniques.

Considerable advantages are obtained by means of certain embodiments of the present invention. A method and a system for analysing a chemical composition of a target are provided.

Surprisingly, the inventors have found out that the detection range of the spectrometer can be greater than a free spectral range. According to certain embodiments of the present invention, cut off values defining the detection band may be selected such that spectral components overlapping the other transmission peaks propagate to the detector. Adjacent peaks of the interferometer are not separated by the free spectral range according to the embodiments of the present invention. The cut off values may be selected such that the detection range is greater than the free spectral range.

By using certain embodiments of the present invention several benefits are obtained. Additional band-limiting filters in the system are not required or the specifications can be significantly relaxed. Further, the mechanical scanning range is not an issue anymore as several peaks can be now scanned simultaneously. The total range covered is greatly enhanced when the mirrors are moved compared to a single scan case.

Additionally, the dynamic range is increased. In higher wavelengths, for example 2 um-2.5 um, the absorbance of materials is much higher than in wavelengths below 2 um. If a material absorbs almost all the light in the higher ranges, then with a single peak scanning system the information is lost. However, in the multi peak method and system according to certain embodiments of the present invention, the same molecular vibrations are detected simultaneously in the weaker wavelengths, this continuing to give information. Furthermore, adding a high-pass filter to a suitable position in the lower wavelengths provides a means of wavelength axis calibration.

Combining the embodiments of the present invention with wide-range mirrors can extend the usable wavelength range by the factor 3 compared to a single peak scanning system. For example, the mirrors may be made of metal. The mirrors may also be 3-layer bragg mirrors, for instance.

Pseudo-wavelength axis calibration of the system can be done in different ways. The calibration may be done by selecting a wavelength target that produces a few unambiguous peaks or by using a filter/target which produces certain repeatable shapes in the spectrum.

According to certain embodiments of the present invention, the detector comprises only one pixel. Such a configuration only allows detection of one specific target substance. The invention is suitable for simultaneous measurements of more than two or three orders. No separation techniques are required. The mixed signal or sum of signals detected by the one pixel detector is sufficient to analyse the chemical composition of the target. Components of such a configuration are very cost efficient.

EMBODIMENTS

Figure 1:
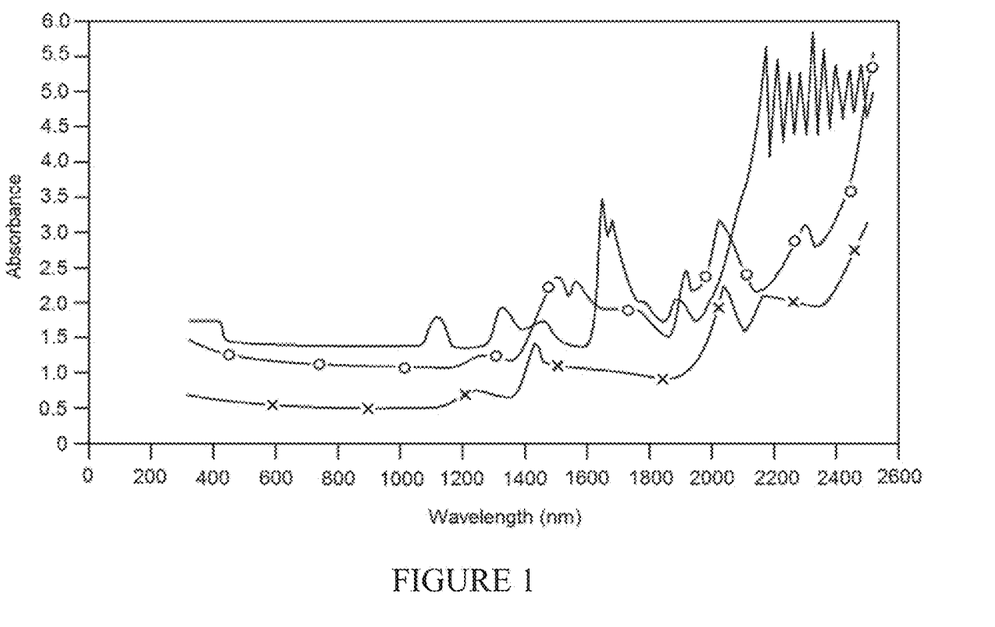
FIG. 1 illustrates a schematic wavelength-absorbance-diagram for three different chemical compositions.

In FIG. 1 a schematic wavelength-absorbance-diagram for three different chemical compositions is illustrated. The absorbance depending on the wavelength in a range between about 300 nm and about 2500 nm is shown for each chemical composition. The absorption spectrum of each chemical composition or material has its own characteristics.

Figure 2:
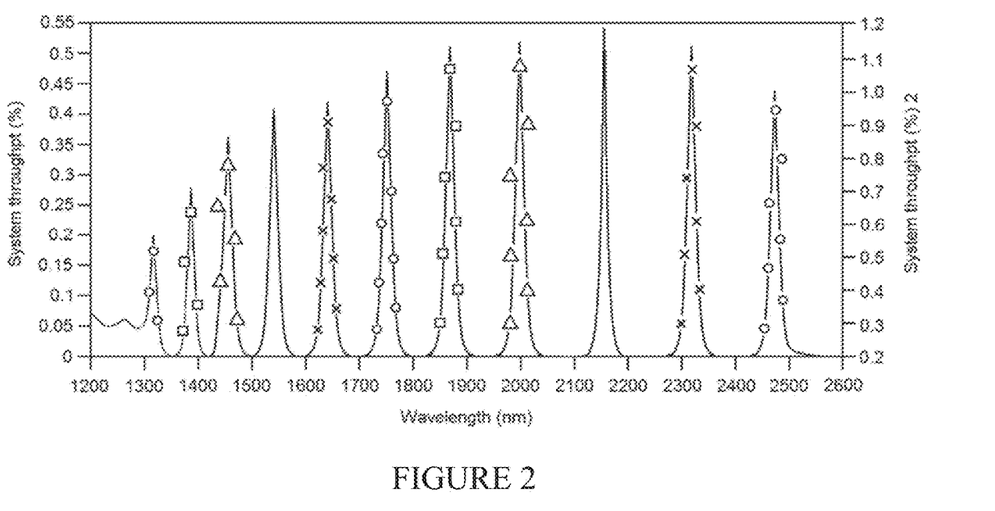
FIG. 2 illustrates a schematic wavelength-system throughput-diagram for different widths of the gap of a Fabry-Perot interferometer.

In FIG. 2 a schematic wavelength-system throughput-diagram for different widths of the gap of a Fabry-Perot interferometer is illustrated. It can be seen that within the wavelength range from 1200 nm to 2600 nm a plurality of transmission peaks can be provided for a specific width of the gap.

Radiation through transmission peaks which are marked with a "rectangle" in FIG. 2 is detected with a gap of about 1900 nm. Radiation through transmission peaks which are marked with a "triangle" in FIG. 2 is detected with a gap of about 2050 nm. Radiation through transmission peaks which are "not marked" in FIG. 2 is detected with a gap of about 2200 nm. Radiation through transmission peaks which are marked with a "x" in FIG. 2 is detected with a gap of about 2400 nm. Radiation through transmission peaks which are marked with an "o" in FIG. 2 is detected with a gap of about 2650 nm.

In other words, one specific width of the gap of the Fabry-Perot interferometer results in a plurality of transmission peaks within the wavelength range from 1200 nm to 2600 nm. It can be seen that, for example, radiation through three transmission peaks can be detected with a gap of about 2650 nm and radiation through two transmission peaks can be detected with a gap of about 2400 nm. The scanned signals, for example the signals marked with an "o" or "x" in FIG. 2, are ambiguous, and thus the plurality of signals cannot be analysed in common spectroscopy, because Fabry-Perot theory is only valid within one free spectral range, and is not capable of demultiplexing mixed signals.

Figure 3:
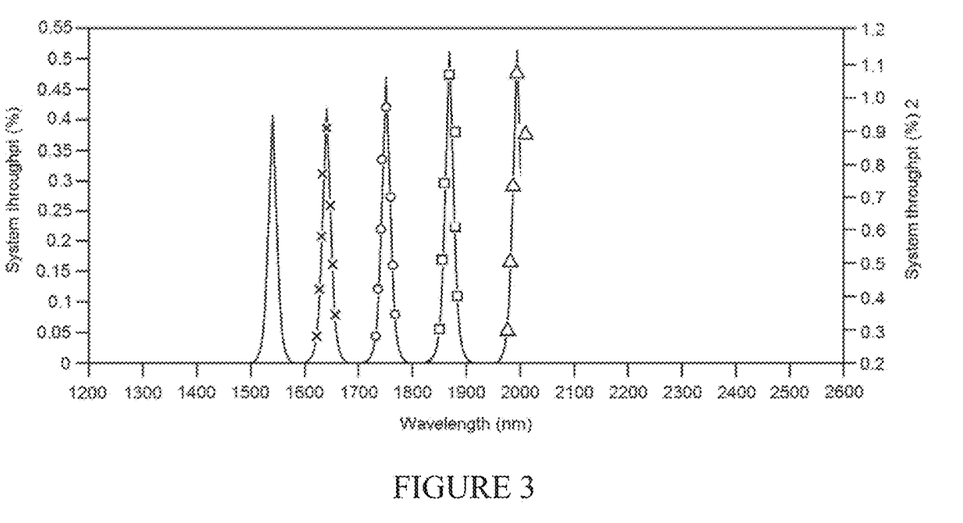
FIG. 3 illustrates a schematic wavelength-system throughput-diagram for different widths of the gap, wherein a first wavelength range is shown.

In FIG. 3 a schematic wavelength-system throughput-diagram for different widths of the gap is illustrated, wherein a first wavelength range is shown. The first wavelength range is between about 1500 nm and about 2000 nm.

Radiation through a transmission peak which is marked with a "rectangle" in FIG. 3 is detected with a gap of about 1900 nm. Radiation through a transmission peak which is marked with a "triangle" in FIG. 3 is detected with a gap of about 2050 nm. Radiation through a transmission peak which is "not marked" in FIG. 3 is detected with a gap of about 2200 nm. Radiation through a transmission peak which is marked with an "x" in FIG. 3 is detected with a gap of about 2400 nm. Radiation through a transmission peak which is marked with an "o" in FIG. 3 is detected with a gap of about 2650 nm.

Each scanned signal, for example the signal marked with an "o" or "x" in FIG. 3, is unambiguous, and thus each signal can be analysed in common spectroscopy. The illustrated first wavelength range is narrower than a single free spectral range.

The detection band of the spectrometer may be defined e.g. by a filter. The spectrometer may be arranged to operate such that the spectrometer is substantially insensitive to spectral components, whose wavelengths are outside a first detection range, i.e. outside of the range between about 1500 nm and about 2000 nm. The filter may be arranged to reject spectral components which are shorter than a first cut off value, i.e. about 1500 nm, and greater than a second cut off value, i.e. about 2000 nm.

The filter may block spectral components at wavelengths outside the detection band from reaching the detector. The cut off values may be selected such that only spectral components within the detection range may propagate to the detector, depending on the spectral position of the transmission peak of the interferometer. The cut off values may be selected such that spectral components overlapping the other transmission peaks do not propagate to the detector. Adjacent peaks of the interferometer are separated by the free spectral range. The cut off values are selected such that the detection range of the spectrometer is narrower than the free spectral range.

Spectral components at wavelengths outside the detection range may also be rejected by utilizing spectral selectivity of the detector and/or another optical component of the spectrometer.

Figure 4:
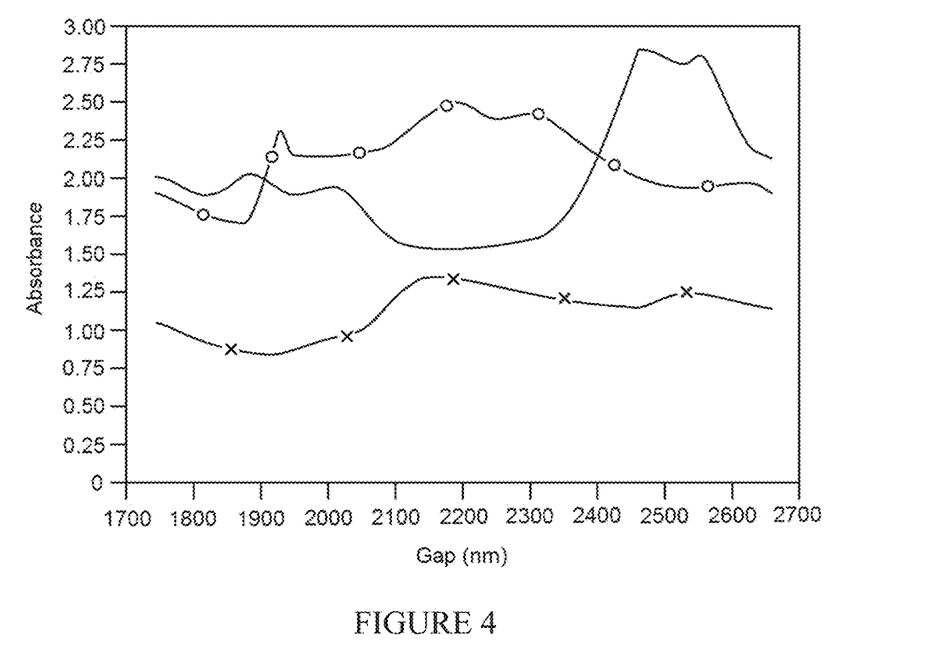
FIG. 4 illustrates a gap-absorbance-diagram for three different chemical compositions.

In FIG. 4 a gap-absorbance-diagram for three different chemical compositions is illustrated. The absorbance depending on the gap between the mirrors of the Fabry-Perot interferometer in a gap range between about 1750 nm and about 2650 nm is shown for each chemical composition. The substances have been scanned with a single peak in the first wavelength range as shown in FIG. 3. A target substance may be, for example, Aspirin, caffeine, fructose, Ibuprofen, lactose, microcrystalline cellulose, Paracetamol, saccarose, water, and others.

Figure 5:
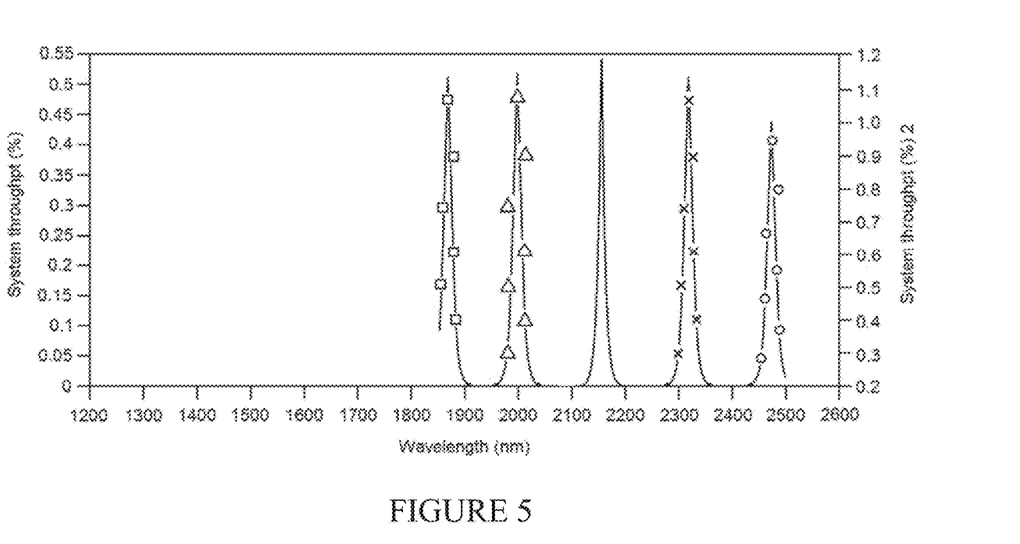
FIG. 5 illustrates a schematic wavelength-system throughput-diagram for different widths of the gap, wherein a second wavelength range is shown.

In FIG. 5 a schematic wavelength-system throughput-diagram for different widths of the gap is illustrated, wherein a second wavelength range is shown. The second wavelength range is between about 1850 nm and about 2500 nm.

Radiation through a transmission peak which is marked with a "rectangle" in FIG. 5 is detected with a gap of about 1900 nm. Radiation through a transmission peak which is marked with a "triangle" in FIG. 5 is detected with a gap of about 2050 nm. Radiation through a transmission peak which is "not marked" in FIG. 5 is detected with a gap of about 2200 nm. Radiation through a transmission peak which is marked with an "x" in FIG. 5 is detected with a gap of about 2400 nm. Radiation through a transmission peak which is marked with an "o" in FIG. 5 is detected with a gap of about 2650 nm.

Each scanned signal, for example the signal marked with an "o" or "x" in FIG. 5, is unambiguous, and thus each signal can be analysed in common spectroscopy. The illustrated second wavelength range is narrower than a single free spectral range.

The detection band of the spectrometer may be defined e.g. by a filter. The spectrometer may be arranged to operate such that the spectrometer is substantially insensitive to spectral components, whose wavelengths are outside a second detection range, i.e. outside of the range between about 1850 nm and about 2500 nm. The filter may be arranged to reject spectral components which are shorter than a first cut off value, i.e. about 1850 nm, and greater than a second cut off value, i.e. about 2500 nm.

The filter may block spectral components at wavelengths outside the detection band from reaching the detector. The cut off values may be selected such that only spectral components within the detection range may propagate to the detector, depending on the spectral position of the transmission peak of the interferometer. The cut off values may be selected such that spectral components overlapping the other transmission peaks do not propagate to the detector. Adjacent peaks of the interferometer are separated by the free spectral range. The cut off values are selected such that the detection range of the spectrometer is narrower than the free spectral range.

Spectral components at wavelengths outside the detection range may also be rejected by utilizing spectral selectivity of the detector and/or another optical component of the spectrometer.

Figure 6:
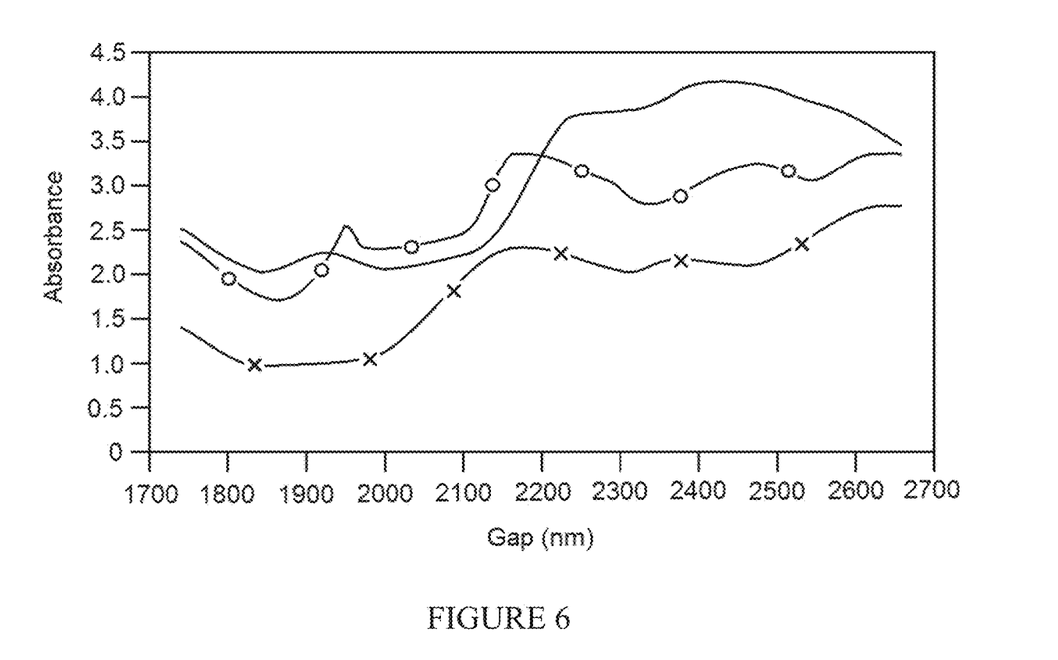
FIG. 6 illustrates another gap-absorbance-diagram for three different chemical compositions.

In FIG. 6 another gap-absorbance-diagram for three different chemical compositions is illustrated. The absorbance depending on the gap between the mirrors of the Fabry-Perot interferometer in a gap range between about 1750 nm and about 2650 nm is shown for each chemical composition. The substances have been scanned with a single peak in the second wavelength range as shown in FIG. 5. A target substance may be, for example, Aspirin, caffeine, fructose, Ibuprofen, lactose, microcrystalline cellulose, Paracetamol, saccarose, water, and the like.

Figure 7:
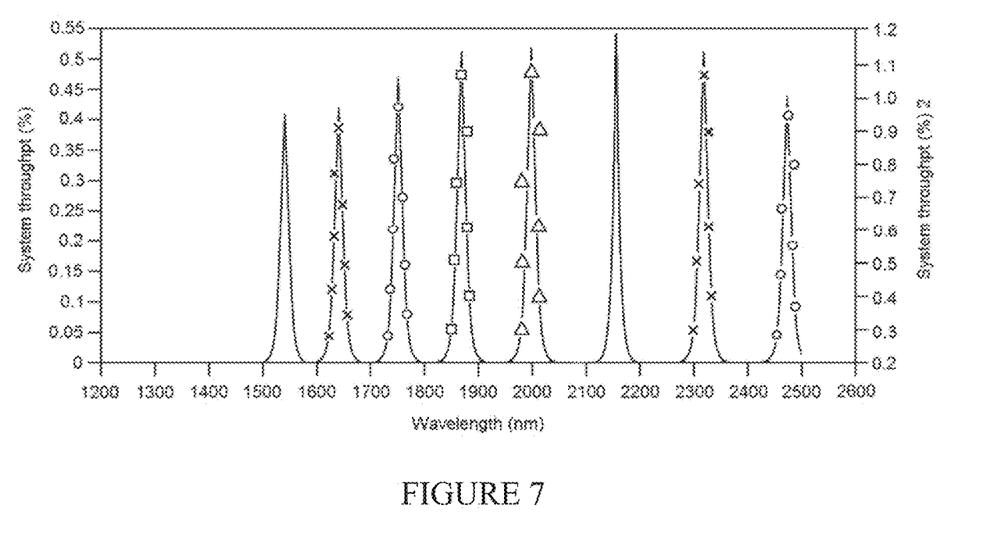
FIG. 7 illustrates a schematic wavelength-system throughput-diagram for different widths of the gap, wherein a third wavelength range is shown.

In FIG. 7 a schematic wavelength-system throughput-diagram for different widths of the gap is illustrated, wherein a third wavelength range is shown. The third wavelength range is between about 1500 nm and about 2500 nm.

Radiation through the transmission peaks which are marked with a "rectangle" in FIG. 7 is detected with a gap of about 1900 nm. Radiation through the transmission peaks which are marked with a "triangle" in FIG. 7 is detected with a gap of about 2050 nm. Radiation through the transmission peaks which are "not marked" in FIG. 7 is detected with a gap of about 2200 nm. Radiation through the transmission peaks which are marked with a "x" in FIG. 7 is detected with a gap of about 2400 nm. Radiation through the transmission peaks which are marked with an "o" in FIG. 7 is detected with a gap of about 2650 nm.

The scanned signals, for example the signals marked with an "o" or "x" in FIG. 7, are ambiguous, and thus the plurality of signals cannot be analysed in common spectroscopy. A plurality of free spectral ranges is shown within the illustrated third wavelength range.

According to certain embodiments of the present invention, a method for analysing a chemical composition of a target is provided. The method comprises placing an electrically tunable Fabry-Perot interferometer in a path of radiation emitted by a radiation source, and detecting the radiation by means of a detector. The detection is made such that multiple pass bands are allowed to be detected simultaneously. In other words, a plurality of transmission peaks is scanned simultaneously. Optical inputs with bandwidth of more than one single free spectral range of the Fabry-Perot interferometer are used in the method. Subsequently, a combination of detected signals is analysed. In other words, mixed signals or radiation through at least two transmission peaks is/are analysed. For example, the two signals marked with "x" in FIG. 7 may be analysed and/or the two signals marked with "o" in FIG. 7 may be analysed. No signal separation techniques are required for analysis. The detector may be a one pixel detector.

According to certain embodiments of the present invention, the detection band of a spectrometer may be defined e.g. by a filter. The spectrometer may be arranged to operate such that the spectrometer is substantially insensitive to spectral components, whose wavelengths are outside a third detection range, i.e. outside of the range between about 1500 nm and about 2500 nm. The filter may be arranged to reject spectral components which are shorter than a first cut off value, i.e. about 1500 nm, and greater than a second cut off value, i.e. about 2500 nm. The cut off values are selected such that the detection range of the spectrometer is greater than the free spectral range. Adjacent peaks of the interferometer are not separated by the free spectral range. The cut off values are selected such that spectral components overlapping the other transmission peaks propagate to the detector.

The filter may block spectral components at wavelengths outside the detection band from reaching the detector. The cut off values may be selected such that only spectral components within the detection range may propagate to the detector, depending on the spectral position of the transmission peaks of the interferometer.

According to certain embodiments, band-limiting filters are not used in the method. According to certain other embodiments of the present invention, spectral components at wavelengths outside the detection range may also be rejected by utilizing spectral selectivity of the detector and/or another optical component of the spectrometer.

Figure 8:
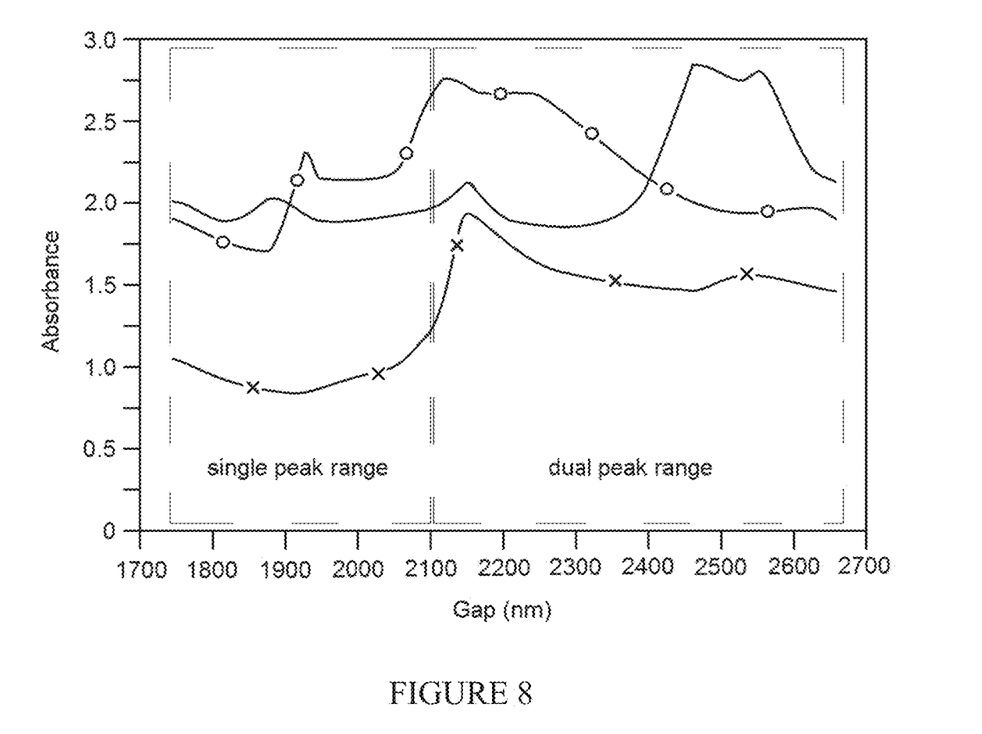
FIG. 8 illustrates a further gap-absorbance-diagram for three different chemical compositions.

In FIG. 8 a further gap-absorbance-diagram for three different chemical compositions is illustrated. The absorbance depending on the gap between the mirrors of the Fabry-Perot interferometer in a gap range between about 1750 nm and about 2650 nm is shown for each chemical composition.

In FIG. 8, there are two sub-ranges shown, i.e. a single peak range and a dual peak range. Radiation through a single transmission peaks is detected with a gap of the mirrors of the Fabry-Perot interferometer of less than about 2100 nm, i.e. in the single peak range. Radiation through two transmission peaks is detected with a gap of the mirrors of the Fabry-Perot interferometer of greater than about 2100 nm, i.e. in the dual peak range. In other words, a part of the spectrum is scanned with a single peak and another part of the spectrum is scanned with two peaks in the third wavelength range as shown in FIG. 7 in accordance with certain embodiments of the present invention. The detection is made such that multiple pass bands are allowed to be detected simultaneously.

The "fingerprints" of different materials have been stored in a library previously, for example on a computer readable medium. The characteristics or "fingerprints" of the different materials have been created by scanning respective known reference substances with the method in accordance with the invention. In other words, detection of known reference substances has been made such that multiple pass bands have been allowed to be detected simultaneously. The results of these reference measurements have been stored in order to teach the system according to the embodiments of the present invention, thus creating the library.

Consequently, it is possible to compare the results of a scanned target substance with stored reference data in order to identify the target substance. As each target substance has its own characteristics, the substance can be identified based on the reference data. A target substance may be, for example, Aspirin, caffeine, fructose, Ibuprofen, lactose, microcrystalline cellulose, Paracetamol, saccarose, water, and the like.

Figure 9:
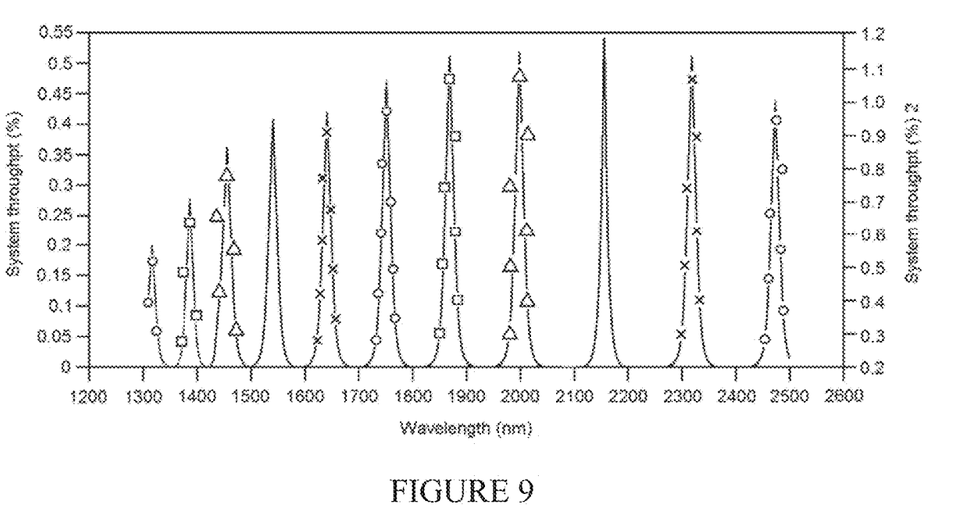
FIG. 9 illustrates a schematic wavelength-system throughput-diagram for different widths of the gap, wherein a fourth wavelength range is shown.

In FIG. 9 a schematic wavelength-system throughput-diagram for different widths of the gap is illustrated, wherein a fourth wavelength range is shown. The illustrated fourth wavelength range is between about 1300 nm and about 2500 nm.

Radiation through the transmission peaks which are marked with a "rectangle" in FIG. 9 is detected with a gap of about 1900 nm. Radiation through the transmission peaks which are marked with a "triangle" in FIG. 9 is detected with a gap of about 2050 nm. Radiation through the transmission peaks which are "not marked" in FIG. 9 is detected with a gap of about 2200 nm. Radiation through the transmission peaks which are marked with a "x" in FIG. 9 is detected with a gap of about 2400 nm. Radiation through the transmission peaks which are marked with an "o" in FIG. 9 is detected with a gap of about 2650 nm.

The scanned signals, for example the signals marked with an "o" or "x" in FIG. 9, are ambiguous, and thus the plurality of signals cannot be analysed in common spectroscopy. A plurality of free spectral ranges is shown within the illustrated fourth wavelength range.

According to certain embodiments of the present invention, a method for analysing a chemical composition of a target is provided. The method comprises placing an electrically tunable Fabry-Perot interferometer in a path of radiation emitted by a radiation source, and detecting the radiation by means of a detector. The detection is made such that multiple pass bands are allowed to be detected simultaneously. In other words, a plurality of transmission peaks is scanned simultaneously. Optical inputs with bandwidth of more than one single free spectral range of the Fabry-Perot interferometer are used in the method. Subsequently, a combination of detected signals is analysed. In other words, mixed signals or radiation through at least two transmission peaks is/are analysed. For example, the two signals marked with "x" in FIG. 9 may be analysed and/or the three signals marked with "o" in FIG. 9 may be analysed.

According to certain embodiments of the present invention, the detection band of a spectrometer may be defined e.g. by a filter. The spectrometer may be arranged to operate such that the spectrometer is substantially insensitive to spectral components, whose wavelengths are outside a fourth detection range, i.e. outside of the range between about 1300 nm and about 2500 nm. The filter may be arranged to reject spectral components which are shorter than a first cut off value, i.e. about 1300 nm, and greater than a second cut off value, i.e. about 2500 nm. The cut off values are selected such that the detection range of the spectrometer is greater than the free spectral range. Adjacent peaks of the interferometer are not separated by the free spectral range. The cut off values are selected such that spectral components overlapping the other transmission peaks propagate to the detector.

The filter may block spectral components at wavelengths outside the detection band from reaching the detector. The cut off values may be selected such that only spectral components within the detection range may propagate to the detector, depending on the spectral position of the transmission peaks of the interferometer.

According to certain embodiments, band-limiting filters are not used in the method. According to certain other embodiments of the present invention, spectral components at wavelengths outside the detection range may also be rejected by utilizing spectral selectivity of the detector and/or another optical component of the spectrometer.

Figure 10:
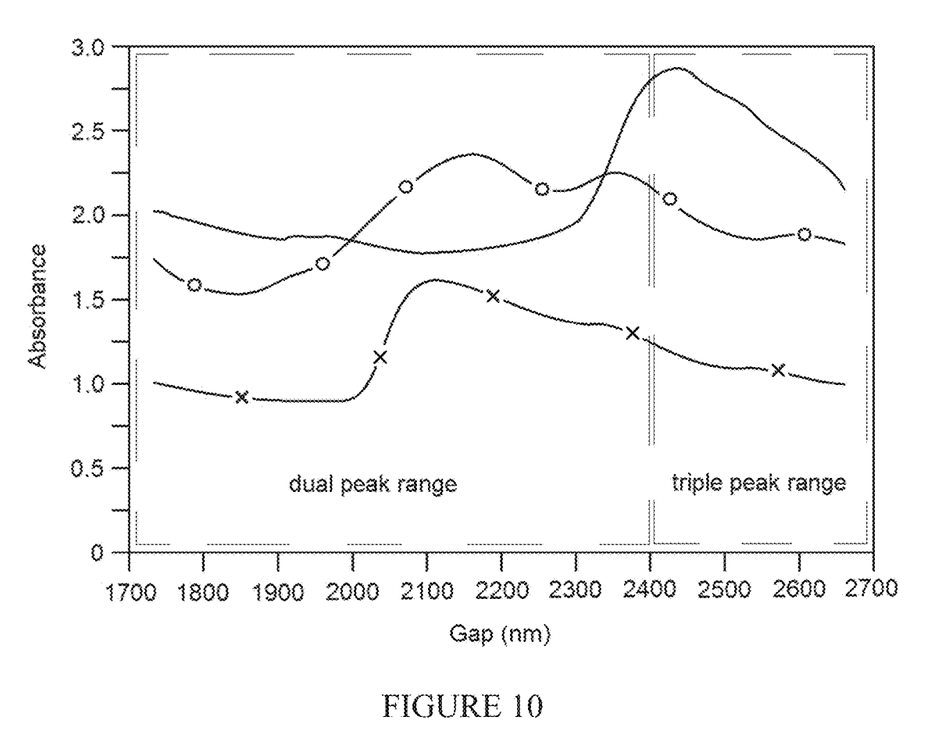
FIG. 10 illustrates a yet further gap-absorbance-diagram for three different chemical compositions.

In FIG. 10 a yet further gap-absorbance-diagram for different chemical compositions is illustrated. The absorbance depending on the gap between the mirrors of the Fabry-Perot interferometer in a gap range between about 1750 nm and about 2650 nm is shown for each chemical composition. The target substance may be, for example, Aspirin, caffeine, fructose, Ibuprofen, lactose, microcrystalline cellulose, Paracetamol, saccarose, water, and the like.

In FIG. 10, there are two sub-ranges shown, i.e. a dual peak range and a triple peak range. Radiation through two transmission peaks is detected with a gap of the mirrors of the Fabry-Perot interferometer between about 1700 nm and about 2400 nm, i.e. in the dual peak range. Radiation through three transmission peaks is detected with a gap of the mirrors of the Fabry-Perot interferometer of greater than about 2400 nm, i.e. in the triple peak range. In other words, a part of the spectrum is scanned with two peaks and a further part of the spectrum is scanned with three peaks in the fourth wavelength range as shown in FIG. 9 in accordance with certain embodiments of the present invention. The detection is made such that multiple pass bands are allowed to be detected simultaneously.

The "fingerprints" of different materials have been stored in a library previously, for example on a computer readable medium. The characteristics or "fingerprints" of the different materials have been created by scanning known reference substances with the method in accordance with the invention. In other words, detection of known reference substances has been made such that multiple pass bands have been allowed to be detected simultaneously. The results of these reference measurements have been stored in order to teach the system according to the embodiments of the present invention, thus creating the library.

Consequently, it is possible to compare the results of a scanned target substance with stored reference data in order to identify the target substance. As each target substance has its own characteristics, the substance can be identified based on the reference data. A target substance may be, for example, Aspirin, caffeine, fructose, Ibuprofen, lactose, microcrystalline cellulose, Paracetamol, saccarose, water, and the like. The invention is suitable for simultaneous measurements of more than two or three orders. No separation techniques are required. The mixed signal or the sum of signals detected by e.g. a one pixel detector is sufficient to analyse the chemical composition of the target.

Figure 11:
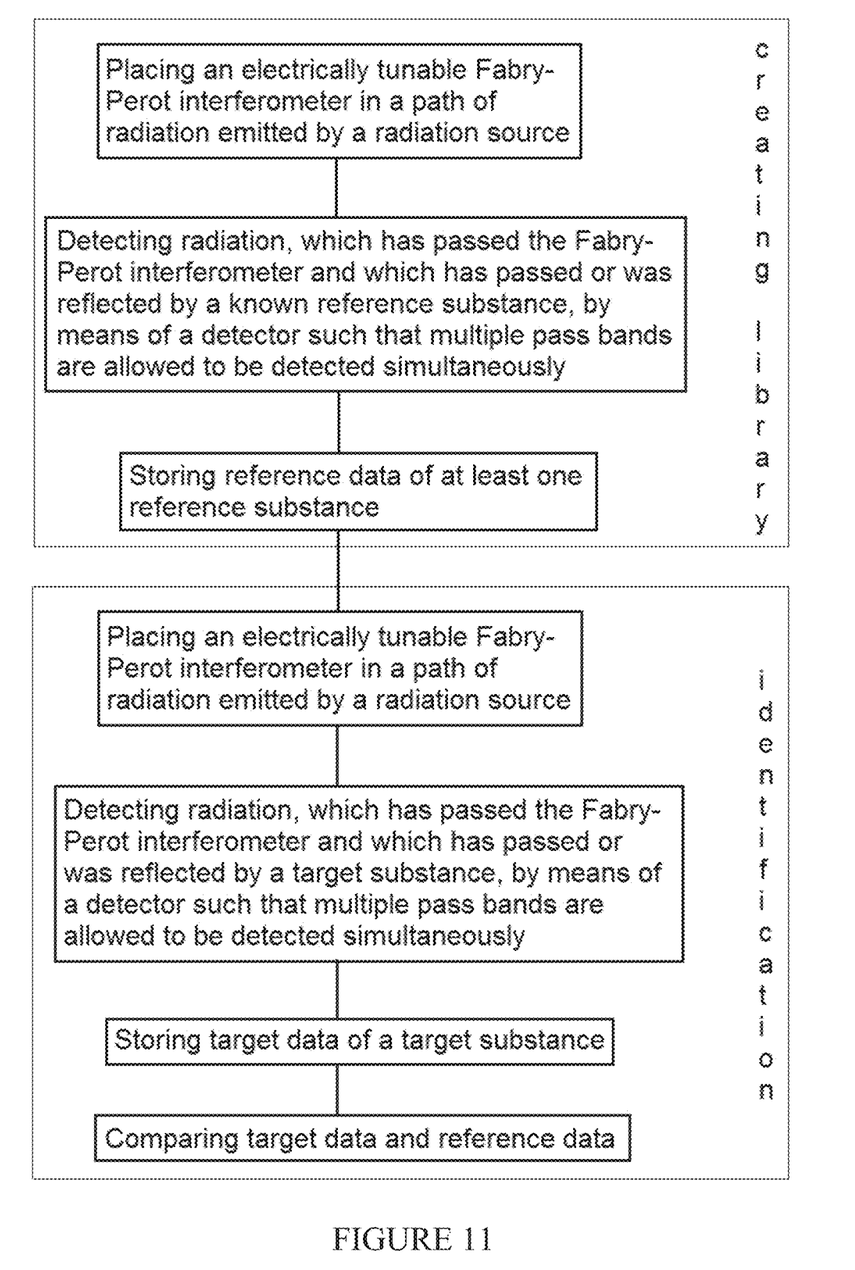
FIG. 11 illustrates a flow chart of a method for analysing a chemical composition in accordance with at least some embodiments of the present invention.

In FIG. 11 a flow chart of a method for analysing a chemical composition in accordance with at least some embodiments of the present invention is illustrated. The method comprises placing an electrically tunable Fabry-Perot interferometer in a path of radiation emitted by a radiation source. The method further comprises detecting the radiation, which has passed the Fabry-Perot interferometer and which has passed or was reflected by a known reference substance, by means of a detector. The detection is made such that multiple pass bands are allowed to be detected simultaneously. In other words, optical inputs with bandwidth of more than one single free spectral range of the Fabry-Perot interferometer are used in the method. Adjacent peaks of the interferometer are not separated by the free spectral range. A plurality of transmission peaks can be scanned simultaneously.

Subsequently, reference data of the known reference substance is stored on a memory of a computing device. Then, the aforementioned procedure may be optionally repeated for one or more other reference substance(s) in order to create a library containing reference data of a plurality of reference substances.

The method further comprises placing an electrically tunable Fabry-Perot interferometer in a path of radiation emitted by a radiation source, which radiation has passed the Fabry-Perot interferometer and which has passed or was reflected by a target substance, and detecting the radiation by means of a detector. The detection is again made such that multiple pass bands are allowed to be detected simultaneously. Subsequently, target data of the target substance is stored on the memory of the computing device and the scanned target data is compared with the stored reference data of the at least one known reference substance in order to identify the target substance. The target substance can be identified if the target data and the reference data match or at least substantially match. In more complex material matrices the identification and analysis can be performed through statistical mathematics tools, such as PLS and PCA, or a learning algorithm can also be applied using neural networking.

Figure 12:
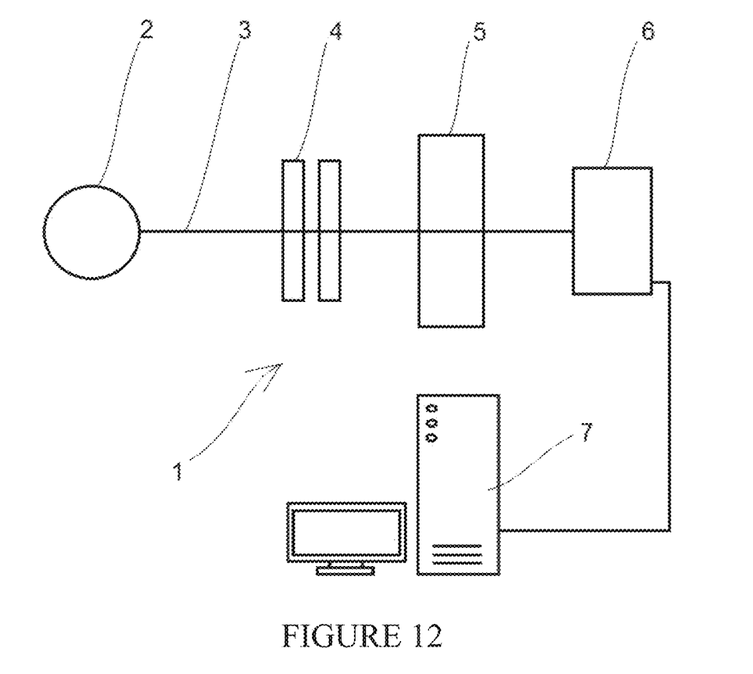
FIG. 12 illustrates a schematic view of a system for analysing a chemical composition of a target in accordance with at least some embodiments of the present invention.

In FIG. 12 a schematic view of a system 1 for analysing a chemical composition of a target in accordance with at least some embodiments of the present invention is illustrated. The system 1 includes a radiation source 2 which is configured to emit radiation 3. The system further includes an electrically tunable Fabry-Perot interferometer 4 which is capable of being placed in a path of radiation 3 emitted by the radiation source 2. Furthermore, the system 1 includes a detector 6 for detecting the radiation 3, which has passed the Fabry-Perot interferometer 4 and which has passed the target 5. The detector 6 is configured to detect the radiation 3 such that multiple pass bands are allowed to be detected simultaneously. I.e., the system is configured to scan a plurality of transmission peaks simultaneously. In other words, the system is configured to measure at least two transmission peaks simultaneously. The system is configured to provide optical inputs with a bandwidth of more than one single free spectral range of the Fabry-Perot interferometer. The system does not include a band-limiting filter.

The detector 6 is connected to a computing device 7. The computing device 7 includes a memory for storing reference data of at least one known reference substance. The computing device 7 is configured to analyse a combination of detected signals or mixed signals. Further, the computing device 7 is configured to compare scanned target data with reference data in order to identify a target substance.

According to an embodiment, the detector 6 comprises only one pixel. Such a configuration only allows detection of one specific target substance. The invention is suitable for simultaneous measurements of more than two or three orders. No separation techniques are required. The (mixed) signal detected by the one pixel detector is sufficient to analyse the chemical composition of the target.

According to another embodiment, the detector 6 comprises a matrix of pixels for imaging purposes. Such a configuration allows detection of a composition of target substances. A plurality of substances may be, for example, contained in a powder. Aspirin and cocaine may be contained in the powder, for instance. Due to the plurality of pixels in the matrix of pixels it is possible to detect both the Aspirin and the cocaine with the detector 6 of the system 1.

Figure 13:
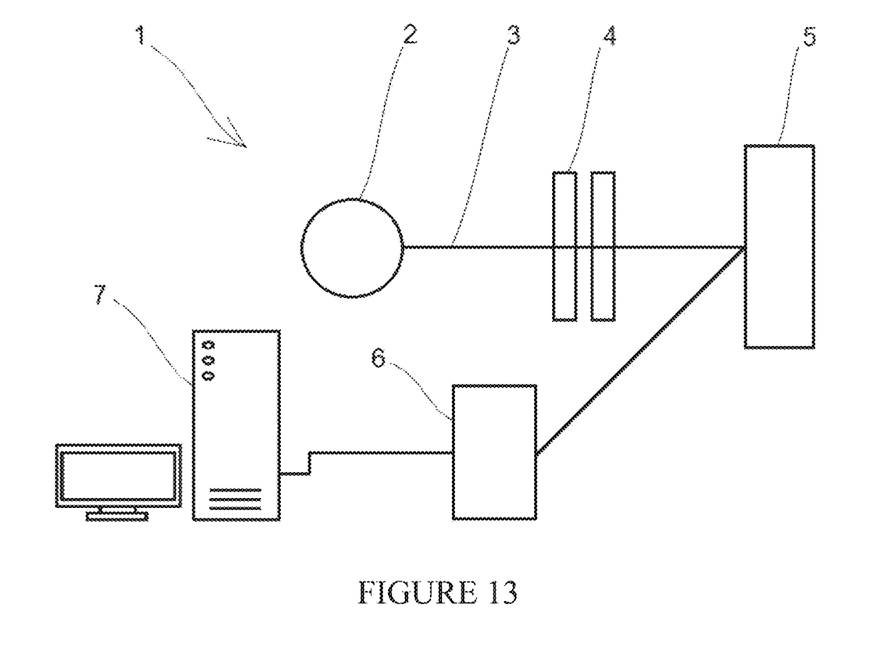
FIG. 13 illustrates a schematic view of a further system for analysing a chemical composition of a target in accordance with at least some embodiments of the present invention.

In FIG. 13 a schematic view of a further system 1 for analysing a chemical composition of a target in accordance with at least some embodiments of the present invention is illustrated. The system 1 includes a radiation source 2 which is configured to emit radiation 3. The system further includes an electrically tunable Fabry-Perot interferometer 4 which is capable of being placed in a path of radiation 3 emitted by the radiation source 2. The Fabry-Perot interferometer 4 is arranged between the radiation source 2 and a target 5. Furthermore, the system 1 includes a detector 6 for detecting the radiation 3, which has passed the Fabry-Perot interferometer 4 and which was reflected by the target 5. The detector 6 is configured to detect the radiation 3 such that multiple pass bands are allowed to be detected simultaneously. The detector 6 is connected to a computing device 7. The computing device 7 includes a memory for storing reference data of at least one known reference substance. The computing device 7 is configured to compare scanned target data with reference data of the at least one known reference substance.

Figure 14:
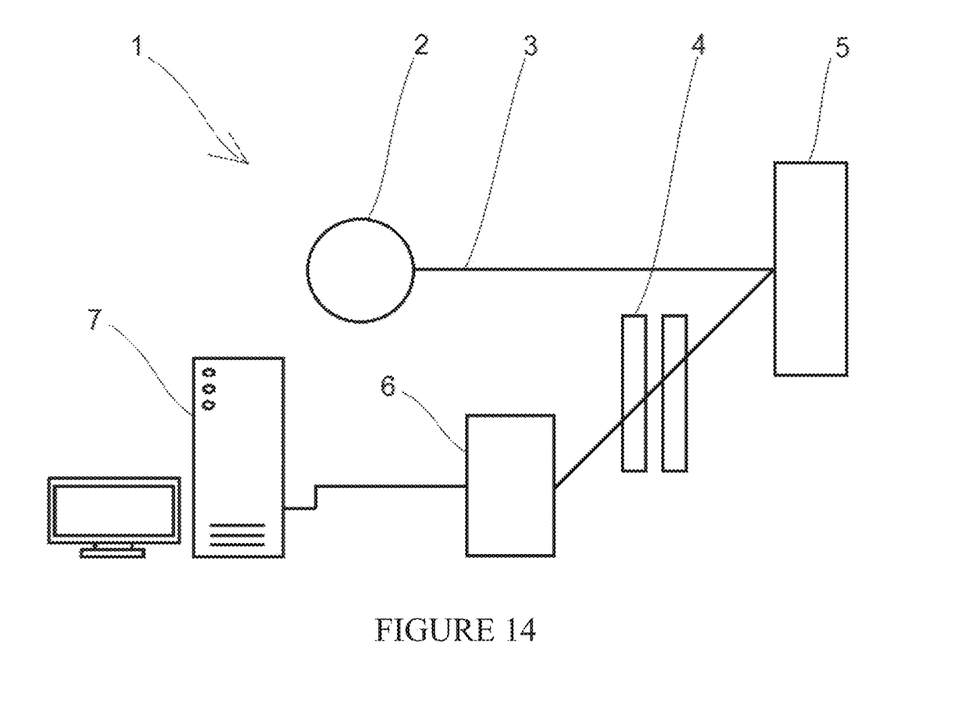
FIG. 14 illustrates a schematic view of a yet further system for analysing a chemical composition of a target in accordance with at least some embodiments of the present invention.

In FIG. 14 a schematic view of a yet further system 1 for analysing a chemical composition of a target in accordance with at least some embodiments of the present invention is illustrated. The system 1 includes a radiation source 2 which is configured to emit radiation 3. The system further includes an electrically tunable Fabry-Perot interferometer 4 which is capable of being placed in a path of radiation 3 emitted by the radiation source 2. Furthermore, the system 1 includes a detector 6 for detecting the radiation 3, which has passed the Fabry-Perot interferometer 4 and which was reflected by the target 5. The Fabry-Perot interferometer 4 is arranged between the target 5 and the detector 6. The detector 6 is configured to detect the radiation 3 such that multiple pass bands are allowed to be detected simultaneously. The detector 6 is connected to a computing device 7. The computing device 7 includes a memory for storing reference data of at least one known reference substance. The computing device 7 is configured to compare scanned target data with reference data of the at least one known reference substance. The system may optionally include a band-limiting filter (not shown) with cut off values, which provide a detection range of a spectrometer greater than a free spectral range.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in analysing a chemical composition of a target.

REFERENCE SIGNS LIST 1 system
2 radiation source
3 radiation
4 Fabry-Perot interferometer
5 target
6 detector
7 computing device

CITATION LIST

Patent Literature

US 2012/0026503 A1
US 2013/0329232 A1
US 2015/0253189 A1

The invention claimed is:

1. A method for analyzing a chemical composition of a target, the method comprising:
placing only a single electrically tunable Fabry-Perot interferometer in a path of radiation emitted by only a single radiation source, wherein the radiation source is configured to provide optical inputs with a bandwidth of more than one free spectral range of the Fabry-Perot interferometer, wherein the Fabry-Perot interferometer is placed in the path of radiation prior to the target,
detecting the radiation, which has passed the Fabry-Perot interferometer simultaneously via multiple resonance peaks of different orders and which has passed or was reflected by the target, by a detector, and wherein detection is made such that multiple pass bands are allowed to be detected simultaneously, wherein the detector comprises only one pixel for detecting radiation, scanning with varying air gaps of the Fabry-Perot interferometer to produce a continuous spectrum for the target, and analyzing mixed signals of multiple resonance peaks of different orders by comparing detected radiation data with stored reference data of at least one known reference substance.

2. The method according to claim 1, wherein a plurality of transmission peaks is scanned simultaneously or wherein at least two transmission peaks are measured simultaneously.

3. The method according to claim 1, wherein a combination of detected signals is analyzed, mixed signals are analyzed or a sum of detected signals is analyzed.

4. The method according to claim 1, wherein band-limiting filters are not used in the method.

5. The method according to claim 1, wherein cut off values of a band-limiting filter are selected such that a detection range of a spectrometer is greater than a free spectral range or cut off values of the band-limiting filter are selected such that spectral components overlapping other transmission peaks propagate to the detector.

6. The method according to claim 5, wherein adjacent peaks of the interferometer are not separated by the free spectral range.

7. A system for analyzing a chemical composition of a target, the system comprising:
   a computing device,
   only a single electrically tunable Fabry-Perot interferometer which is configured to be placed in a path of radiation emitted by only a single radiation source, wherein the radiation source is configured to provide optical inputs with a bandwidth of more than one free spectral range of the Fabry-Perot interferometer, wherein the Fabry-Perot interferometer is placed in the path of radiation prior to the target,
   a detector for detecting the radiation, which has passed the Fabry-Perot interferometer simultaneously via multiple resonance peaks of different orders and which has passed or was reflected by the target, and wherein the detector is configured to detect the radiation such that multiple pass bands are allowed to be detected simultaneously, wherein the detector comprises only one pixel for detecting radiation,
   wherein the system is configured to scan with varying air gaps of the Fabry-Perot interferometer to produce a continuous spectrum for the target, and
   the system comprises a memory for storing reference data of at least one known reference substance and the computing device is configured to analyze mixed signals of multiple resonance peaks of different orders by comparing detected radiation data with the stored reference data.

8. The system according to claim 7, wherein the system is configured to scan a plurality of transmission peaks simultaneously or wherein the system is configured to measure at least two transmission peaks simultaneously.

9. The system according to claim 7, wherein the system does not include a band-limiting filter.

10. The system according to claim 7, wherein the system includes a band-limiting filter with cut off values, which provide a detection range of a spectrometer greater than a free spectral range.

11. The system according to claim 7, wherein the system includes means for comparing scanned target data with reference data of the at least one known reference substance.

* * * * *